United States Patent

[11] 3,632,216

[72] Inventor Henry H. Cary
 Pasadena, Calif.
[21] Appl. No. 828,664
[22] Filed May 28, 1969
[45] Patented Jan. 4, 1972
[73] Assignee Cary Instruments
 Monrovia, Calif.

[54] CIRCULAR-DICHROISM MEASUREMENT SYSTEM CHARACTERIZED BY NOISE CANCELLATION
27 Claims, 3 Drawing Figs.

[52] U.S. Cl. .................................................... 356/114,
 250/225, 350/154
[51] Int. Cl. ...................................................... G01n 21/40
[50] Field of Search............................................ 356/114,
 116, 117; 350/154; 250/225

[56] References Cited
UNITED STATES PATENTS

| | | | |
|---|---|---|---|
| 3,257,894 | 6/1966 | Grosjean...................... | 356/117 |
| 3,283,644 | 11/1966 | Saltzman...................... | 356/116 |
| 3,446,557 | 5/1969 | Wilkinson.................... | 356/116 |

FOREIGN PATENTS

| 1,129,940 | 10/1968 | Great Britain................ | 356/114 |

Primary Examiner—Ronald L. Wibert
Assistant Examiner—J. Rothenberg
Attorney—White & Haefliger ABSTRACT: The disclosure concerns the provision of means for reducing problems associated with lamp intensity fluctuation and random noise in circular-dichroism measurement instrumentation.

PATENTED JAN 4 1972

3,632,216

INVENTOR.
HENRY H. CARY
By White & Haefliger
ATTORNEYS.

CIRCULAR-DICHROISM MEASUREMENT SYSTEM CHARACTERIZED BY NOISE CANCELLATION

BACKGROUND OF THE INVENTION

This invention relates generally to instrumentation for making circular-dichroism measurement with polarized light. More specifically, the invention concerns improving the precision of such measurements through noise reduction.

In the past, and as exemplified in U.S. Pat. No. 3,257,894, the measurement of circular-dichroism (a very useful optical property of substances, and defined as the difference in absorption of an optically active sample when determined using left-circularly polarized light and right-circularly polarized light), has involved the step of obtaining the ratio of alternating and direct current components of an electrical signal obtained at the output of a detector such as a phototube. Light incident upon the detector, and resulting in production of that signal, is typically derived by transmission as a beam from a source including a monochromator, through a polarizer, then through a polarization or electro-optic modulator wherein the plane-polarized light is elliptically polarized in a cyclically varying manner (characterized by two counterrotating, circularly polarized components, the relative magnitudes of the two components changing cyclically in time—at a "modulation frequency"—so that the dominant component is alternately right- and left-circularly polarized), and finally through a sample. The latter, when circular-dichroic, absorbs unequally the circularly polarized components of opposite sense and of periodically varying relative magnitude, so that the total amount of light incident upon the phototube undergoes a corresponding periodic variation, i.e. larger when the predominant circularly polarized component of the light passing through the sample is of the sense absorbed to lesser degree by the sample, and smaller when the predominant circularly polarized component is of the sense absorbed to greater degree by the sample. The fluctuating component of the phototube output is of frequency equal to the modulation frequency and with amplitude proportional to the difference between transmission levels for the circularly polarized components of opposite sense. The DC component on the other hand corresponds to the average or mean transmission of the sample for light at the wavelength of interest.

It is found in practice that the above ratio method at best yields an approximation of the true value of circular-dichroism, and is characterized in certain cases by objectionable inaccuracy. For example, the error in the approximation can become a significant fraction of 1 percent with samples in which the dichroism is as large as one-tenth of the absorbance which corresponds to the average transmittance value of the sample.

As a means of reducing the inaccuracies associated with such prior techniques, there is described in that certain commonly assigned Gerald E. Hooper application for U.S. Letters Patent Ser. No. 723,188, filed on Apr. 22, 1968, instrumentation in which the AC component of the detection output is processed to obtain the value of:

$$\Delta A = \log I_R - \log I_L \qquad \text{Eq. 1}$$

Where $I_L$ = the detector output during an interval of detection of transmission of predominantly left-circularly polarized light, and $I_R$ = the detector output during an interval of detection of transmission of predominantly right-circularly polarized light.

In this regard, $\Delta A$ represents an accurate value of circular-dichroism, neglecting error due to noise generation.

One difficulty that arises in making circular-dichroism measurements either by the method described in the above-mentioned U.S. Pat. No. 3,257,894, or by the method described in the Hooper application referred to, is the problem of excess noise generation. Such noise prevents improvement of the sensitivity to the theoretical limit as imposed by "shot" effect at the phototube. In reference to the Hooper application, eq. 1 can be rewritten as follows:

$$\Delta A = \log(T_R/k) - \log(T_L/k) \qquad \text{Eq. 2}$$

where $T_L = kI_L$
$T_R = kI_R$ are the transmittances of the sample for left- and right-circularly polarized light respectively, and $k$ = an unknown variable representing intensity fluctuations, and consequently signal fluctuations, generated by lamp (light source) fluctuations in a random manner from one half-cycle to the next.

If the lamp intensity changes between the half-cycle in which $I_L$ is generated and the half-cycle in which $I_R$ is generated, this may be represented by the insertion of different values for $k$, viz.:

$\Delta A$ measured
$= \log(T_R/k_R) - \log(T_L/k_L)$
$= \log T_R - \log T_L + \log(k_L/k_R)$
$= \Delta A \text{ true} + \log(k_L/k_R) \qquad \text{Eq. 3}$ Thus the measured dichroism is in error by the additive term $\log(k_L/k_R)$. Accordingly, it is seen that the precision of measurement of circular-dichroism, as represented by the value $\Delta A$, is adversely affected by fluctuations in the value of "$k$" due to noise generation at the light source.

SUMMARY OF THE INVENTION

It is a major object of the present invention to provide a practical means for reducing problems associated with lamp intensity fluctuation and random noise in circular-dichroism measurement instrumentation, the basic idea being to cancel the effects of lamp fluctuations by comparing two oppositely polarized beams of light that originated at the lamp. For this purpose, advantage is taken of the fact that monochromatic light leaves the electro-optic modulator in two beams, one of which is left-circularly polarized when the other is right-circularly polarized, and vice versa. Instead of utilizing only one beam, both are allowed to pass through the sample, after which they are separated and caused to fall on separate detectors, or their equivalents, so that both detectors will generate signals characterizing the circular-dichroism of the sample. The generated signals are then processed and combined in such manner as to effect cancellation of noise due to lamp fluctuation. This arrangement is especially advantageous when incorporated in a system utilizing principles described in the above referred to Hooper application and incorporating two photomultipliers, as will be described.

In a broad sense, the invention, then, may be considered to embrace a combination that includes means defining a zone adapted to receive a sample; illuminating means, including a source of light, for passing through that zone two predominantly circularly polarized light beams of opposite sense; and detection and display means disposed to receive the beams after passage through the zone, and adapted to respond thereto by indicating a measured value of circular-dichroism for that zone, and in such manner that fluctuations in light intensity which are common to said two beams mutually cancel at least in part in operation of the detection and display means and have reduced effect on the measured value; whereby fluctuations in operation of the light source affect the measured value to a lesser extent than they affect each of the two beams individually.

With regard to the referred-to detection and display means, it may typically include light-sensitive means operable in response to interception of the respective beams to produce corresponding electrical currents each of which is characterized by signal and noise components, certain noise components being generated by operation of the light-sensitive means; and processing means responsive to the electrical currents to produce logarithmic versions thereof, and to combine such versions in such manner that the noise components are substantially reduced and a resultant signal is produced corresponding to the circular-dichroism of the sample. Typically, the light-sensitive means may comprise the respective photocathodes of two photomultipliers located to intercept the respective beams, the currents consisting of electrons emitted by the photocathodes.

Further, the processing means referred to may typically comprise, in association with each photomultiplier, feedback circuitry connected between an output electrode and a dynode voltage input of that photomultiplier and characterized as operating to maintain substantially constant an amplified output appearing at the output electrode. As a result, the dynode voltage at the dynode voltage input varies as a substantially logarithmic function of the corresponding one of the electrical currents. In this regard, the processing means advantageously includes two channels respectively connected with the dynode voltage inputs, and on which the logarithmic versions are transmitted, together with combining circuitry for combining the transmitted logarithmic versions. In this regard, the latter circuitry may include an inverter connected with one channel for inverting the phase of the logarithmic version associated therewith in which event a combiner may add the transmitted logarithmic versions; alternatively, in the absence of such an inverter, the combiner may subtract the transmitted logarithmic versions.

These and other objects and advantages of the invention, as well as the details of an illustrative embodiment, will be more fully understood from the following detailed description of the drawings, in which:

DESCRIPTION OF PREFERRED EMBODIMENTS

Figure 1:
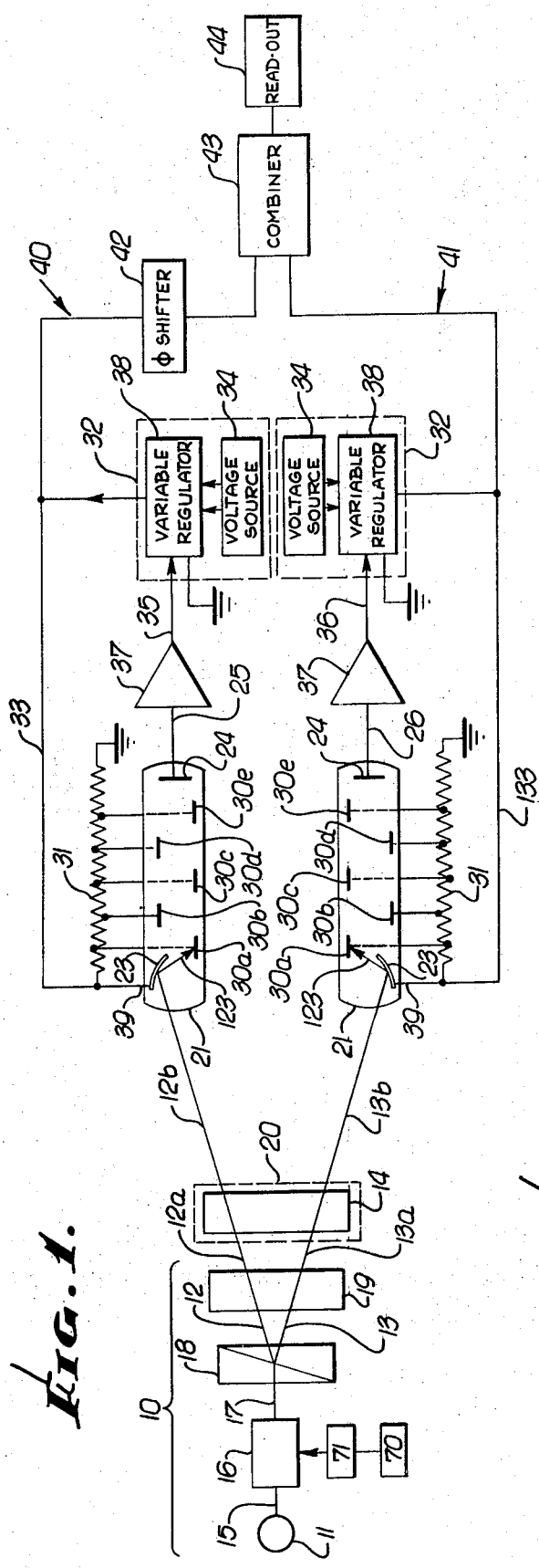
FIG. 1 is a block diagram of a circular-dichroism measurement system incorporating the invention.

Referring to FIG. 1, the system illustrated comprises illuminating means such as designated at 10, and including a light source 11, for effecting passage of two oppositely circularly polarized light beams 12a and 13a through a sample 14 whose circular-dichroism is to be measured. The source 10 typically emits electromagnetic radiation 15 as a continuum over a relatively broad range of wavelengths, which may be in the visible, infrared and/or ultraviolet portions of the electromagnetic spectrum. The term "light" will be used to designate any of such radiation. The monochromator 16 has the function of selecting from this continuum a relatively narrow band of wavelengths for use in measuring the circular dichroism of the sample, as is known. Depending upon the application, the monochromator may be a relatively coarse apparatus, or a fine high-resolution device such as that employed in the Model 15 Automatic Recording Spectrophotometer produced by Cary Instruments, Monrovia, California. A drive 70 may be coupled via scan control 71 to the monochromator to cause it sequentially to select different narrow wavelength bands of radiation for transmission at 17, the arrangement being such that the nominal or central wavelengths of the selected bands form the locus of a smoothly varying function of time—a monotonic function—of approximately constant slope.

The illuminating means 10 is also shown to include a polarizer 18 disposed to receive light 17 and to derive therefrom two substantially linearly polarized beams 12 and 13 which are polarized mutually orthogonally. Finally, the means 10 includes an optical retarder 19 characterized by variable linear birefringence, receiving the linearly polarized beams 12 and 13 and converting them into the referred-to predominantly circularly polarized beams 12a and 13a of opposite sense. In this regard, the beams 12a and 13a are characterized by elliptic polarization varying cyclically in correspondence with the retarder cyclically varying birefringence, elliptically polarized light being understood to be composed of unequal amounts of circularly polarized light of opposite sense. In this regard, "linearly polarized," and "circularly polarized" are special cases of "elliptically polarized" light. One such retarder of unusually advantageous construction and mode of operation is described in commonly assigned Paige B. Hooper application for U.S. Letters Patent, Ser. No. 595,194, now U.S. Pat. No. 3,495,912.

As mentioned, the light beams 12a and 13a are incident upon the sample 14, in zone 20, which absorbs unequally the circularly polarized components of opposite "sense" in each beam. Accordingly, as the ellipticity periodically changes sign, the total amount of light in each beam 12b and 13b emergent from the sample undergoes a corresponding periodic variation, i.e. large when the light passing through the sample possesses a circularly polarized component of the sense absorbed to lesser degree by the sample, and smaller when the circularly polarized component is of the sense absorbed to greater degree by the sample.

Pursuant to an important aspect of the invention, light-sensitive means is provided to be operable in response to interception of the respective beams 12b and 13b to produce corresponding electrical currents each of which is characterized by signal and noise components, certain noise components being generated by operation of the illuminating means, and other components by operation of the light-sensitive means. In the illustrated example, the latter means takes the form of two photomultipliers 21 having photocathodes 23 located to intercept the beams 12b and 13b, and the electrical currents consist of electrons 123 emitted from the photocathodes and collected at the dynodes 30a. Such signals (currents) have magnitudes proportional to the intensities of the respective light beams 12b and 13b, whereby such magnitudes vary cyclically in correspondence with the cyclically varying ellipticity referred to as well as the dichroic characteristic of the sample.

Further, the photomultipliers act as current amplifiers having amplification factors determined by voltages impressed on the dynodes designated at 30a—30e, as by means of the voltage dividers 31 to which voltages are supplied from regulated sources 32 and leads 33 and 133. By virtue of multiplicative processes at each of the several dynodes 30a—30e, the currents transmitted at 25 and 26 from anodes 24 are in effect greatly amplified versions of the respective photocathode currents 123. (It will be understood that FIG. 1 shows five dynodes only illustratively; in practice, commercially available and useful photomultiplier tubes may have more, or fewer, than five dynodes. Further, while the dividers 31 and the voltage regulators 38 are illustrated as being connected to ground, it will be understood that the system may be operated "-floating"—that is, with a return path other than ground between each divider 31 and its respective regulator 38.) The regulated sources 32 are shown to include fast-acting regulators 38 to which constant voltage is supplied at 34, for regulation of dynode control voltage as an inverse function of the control signal inputs at 35 and 36. The latter are amplified versions of the outputs 25 and 26 from the photoanodes 24, suitable amplifiers being indicated at 37.

The above elements 37, 32, 33 and 133 may be considered as one form of fast-acting feedback control circuitry, connected between an output electrode 24 of each photomultiplier and dynode voltage input at 39 to the photomultiplier, and characterized as operating to maintain substantially constant the amplified outputs at 25 and 26. As a result, due to the large number of dynodes 30a—30e, the dynode voltage inputs on leads 33 and 133 vary as substantially logarithmic functions of the corresponding electrical currents 123. The advantages of such conversion of the currents at 123 to logarithmic versions in terms of accuracy of circular-dichroism measurement are fully described in the above-mentioned Gerald E. Hooper application.

In accordance with the invention, other means (including such feedback circuitry) is provided to be responsive to the electron streams at 123 not only to produce the referred-to logarithmic versions at 33 and 133, but also to combine such versions in such manner that certain noise components of the logarithmic versions, corresponding to certain noise components of the photomultiplier electron streams 123, are subject to substantial mutual cancellations and a resultant signal is produced corresponding to the circular dichroism of the sample. As seen in FIG. 1, such other means includes first and second channels 40 and 41 respectively connected to the dynode voltage inputs of the two photomultipliers, the referred-to logarithmic versions being transmitted on these channels.

Such other means also includes an adder or combiner 43 connected with the channels for combining such logarithmic versions. This leads to a $\sqrt{2}$ improvement in the signal-to-noise ratio where the noise is *random and uncorrelated* as in the case of "*shot*" noise arising in the photomultipliers or phototubes. However, the lamp intensity fluctuation seen by the photomultipliers is correlated since both are looking at the same lamp or light source. Combining circuitry may include an inverter or phase shifter 42 operable in channel 40 to invert the phase of the logarithmic version of the photomultiplier output 25. Thus the 180° phase shift effected at 42 results in *cancellation* of the *lamp fluctuation "noise"* when the processed signals in the two channels 40 and 41 are combined or added as at 43. This may be seen in an oversimplified way from eq. 3, which may be taken as representing each of the outputs 40 and 41; applying suitable subscripts to identify these independent outputs from the two halves of the system;

$(\Delta A_{measured})_{40} = \log(T_R/(k_R)_{40}) - \log(T_L/(k_L)_{40})$    Eq. 4a $(\Delta A_{measured})_{41} = \log(T_R/(k_R)_{41}) - \log(T_L/(k_L)_{41})$    Eq. 4b But because of the timing of the system operation we may identify $(k_R)_{40} \equiv (k_L)_{41}$    Eq. 5a $(k_R)_{41} \equiv (k_L)_{40}$    Eq. 5b Inserting these identities, $(\Delta A_{measured})_{40} = \log(T_R/(k_L)_{41}) - \log(T_L/(K_L)_{40})$    Eq. 6a $(\Delta A_{measured})_{41} = \log(T_R/(k_L)_{40}) - \log(T_L/(k_L)_{41})$.    Eq. 6b The system of FIG. 1 in effect adds the expressions in equation 6a and 6b:

$\Delta A_{measured} = (\Delta A_{measured})_{40} + (\Delta A_{measured})_{41}$ $= \log T_R - \log(k_L)_{41} - \log T_L + \log(k_L)_{40}$ $+ \log T_R - \log(k_L)_{40} - \log T_L + \log(k_L)_{41}$ $= 2 \log T_R - 2 \log T_L = 2 \log(T_R/T_L) = 2\Delta A_{true}$ with cancellation of the remaining terms. It will be apparent that the same result may be obtained without phase shifter 42 if combiner 43 is made a subtractor rather than an adder. Appropriate readout circuitry designated at 44, in which generation of abscissa (wavelength) values may be synchronized with drive 70, may correspond to that described in the above-mentioned Gerald E. Hooper application.

Figure 2:
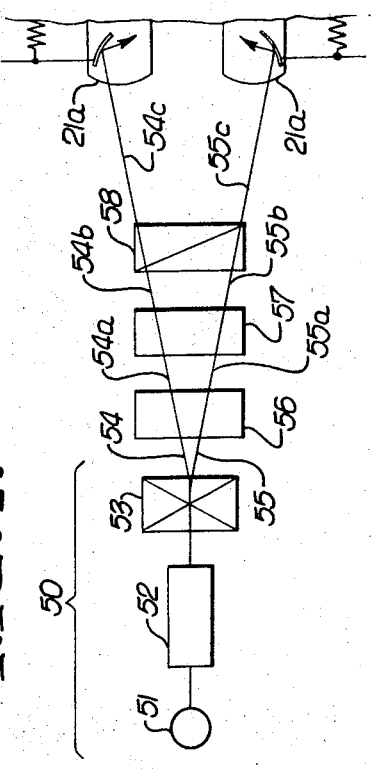
FIGS. 2 and 3 are block diagrams of modified systems.

FIG. 2 illustrates a modified version of the FIG. 1 system wherein illuminating means 50, comprising a light source 51, monochromator 52 and beam-splitting polarizer or scrambler element 53, produces two beams 54 and 55, *each* comprising therein circularly polarized constituents *of opposite sense in equal magnitude* for passage through the sample zone 56. (For example, such beams may be substantially linearly polarized or substantially randomly polarized.) After passage through the sample, the beams 54a and 55a pass through the optical retarder 57 characterized by cyclically variable linear birefringence and adapted to derive from beams 54a and 55a two elliptically polarized beams 54b and 55b. The latter then pass through the polarizing means 58 from which plane-polarized beams 54c and 55c are transmitted to the detectors 21a operating as previously described in FIG. 1.

Figure 3:
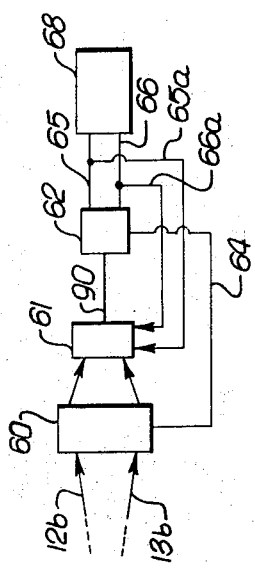

FIG. 3 is representative of systems embodying the invention, but having only one photomultiplier, such systems operating on a phase separation, frequency separation or time sequence separation basis, as contrasted with FIG. 1 above operating on a space separation basis.

In the case of phase separation, the two beams 12b and 13b produced as in FIG. 1 are processed at 60 as by chopping at a common frequency, but with different phase, and converged toward a single phototube or photomultiplier 61. The serial output signals 90 of the phototube are subjected to separation at 62, with synchronization at 64 with the chopper, to produce two signals at 65 and 66 corresponding to signals at 35 and 36 in FIG. 1. Feedback to the phototube is indicated at 65a and 66a. The two signals at 65 and 66 are then combined and read out after appropriate phase readjustment, all as indicated by block 68.

In a frequency separation system, the two beams 12b and 13b would be chopped at different frequencies, and then directed to a single phototube. The signal-processing apparatus would include frequency-sensitive apparatus for separating out the signal components corresponding to the two beams.

The time sequence separation system makes time separation of the phototube output signal into two components respectively identifiable with each of the two beams 12b and 13b. These components are directed into different channels, the processing then continuing as described in the case of phase separation. While both time sequence separation and phase separation involve gating the signal into two different channels 65 and 66, in the case of time separation the gating would be a simple alternation process, whereas in the case of phase separation the gating would be such that the two channels would receive the signal from the photomultiplier during overlapping time intervals.

While the versions discussed in the preceding four paragraphs offer neither the direct simultaneous moment-for-moment cancellation of lamp fluctuations, nor the $\sqrt{2}$ signal-to-noise improvement, of the two-photomultiplier system, suitable choice of the phasing or chopping arrangements in the FIG. 3 system produces some substantial improvement in statistical reduction of the effect of lamp noise, with reduced cost. Further, in the single-photomultiplier system there is no shot noise advantage, since the total amount of light reaching the phototube per unit time cannot be increased over that with the single-beam system.

Summarizing, the apparatus of FIG. 1 may be characterized as follows:

a. a source (such as 11) of substantially randomly polarized light of a relatively wide band of wavelengths;

b. a monochromator (such as 16) disposed to receive such light and select therefrom light of a relatively narrow band of wavelengths, that band having a nominal wavelength;

c. a polarizer (such as 18) disposed to receive said selected light and to derive therefrom two substantially linearly polarized beams polarized mutually orthogonally;

d. an element (such as 19) having cyclically varying linear birefringence, disposed to receive the polarized beams from the polarizer and adapted to form therefrom two elliptically polarized beams whose ellipticity varies cyclically in correspondence with said cyclically varying birefringence, elliptically polarized light being understood to be composed of unequal amounts of circularly polarized light of opposite sense;

e. means defining a zone (such as 20) adapted to received a sample, and for passage therethrough of the elliptically polarized light, whereby any circular-dichroic characteristic of a sample 14 which may be positioned in that zone is manifested as unequal reduction of the intensities of said circularly polarized beams of opposite sense in the course of passage through said zone, and in turn whereby the intensities of said unequally reduced beams 12b and 13b vary cyclically in accordance with said varying ellipticity and said dichroic characteristic;

f. two photomultipliers (such as 21) each disposed to receive one of the elliptically polarized beams, and to produce in response thereto an electrical signal (at 123) whose magnitude is substantially proportional to the intensity of said elliptically polarized beam, whereby said magnitude varies cyclically in correspondence with said cyclically varying ellipticity and said dichroic characteristic;

g. dynode voltage supply means (such as 32, 33, 133 and 31) for independently activating and adjusting the amplification of each of said photomultipliers, said activating and said controlling of each said photomultiplier proceeding substantially independently of said activating and said controlling of the other said photomultiplier, and said activating and controlling being characterized by application to each said photomultiplier of a dynode voltage;

h. a pair of electrical amplifier means 37 each connected to receive one of said electrical signals, and adapted to regulate the corresponding one of said dynode voltage supply means so as to maintain the corresponding said electrical signal substantially constant and at a predetermined level;

whereby a time-varying part of each said dynode voltage represents the circular-dichroism of a sample placed in said zone, except for the inclusion in said time-varying part of unwanted noise components unrelated to said dichroism;

i. means (such as 42, 43 and 44) for combining additively said two time-varying parts with a polarity inversion of one of said parts relative to the other, to produce an improved representation of said circular-dichroism characterized by substantially reduced relative magnitudes of said unwanted noise components.

With regard to the above, and considering the broad teachings of the invention, the elements $a$, $b$, $c$ and $d$ may be considered as only one particularly and unusually advantageous form of what may be more generally referred to as illuminating means, including a source of light, for passing through a sample zone two predominantly circularly polarized light beams of opposite sense. Further, the elements $f$, $g$, $h$ and $i$ may be considered as only one particularly and unusually advantageous form of what may be more generally referred to as detection and display means disposed to receive the beams after passage through the sample zone, and adapted to respond thereto by indicating a measured value of circular-dichroism for that zone, and in such a manner that fluctuations in light intensity which are common to the two beams mutually cancel at least in part in operation of the detection and display means and have reduced effect on the measured value. Accordingly, fluctuations in operation of the light source affect the measured value to lesser extent than they affect each of the two beams individually. Also, the above broadly defined detection and display means may be considered as embracing the FIG. 3 system, as well as equivalents to the systems of FIGS. 1, 2 and 3.

I claim:

1. In a circular-dichroism measurement system, the combination comprising means including a light source to effect simultaneous passage of two predominantly circularly polarized light beams of opposite sense through a sample whose circular-dichroism is to be measured, light-sensitive means operable in response to simultaneous interception of the respective beams to produce corresponding electrical currents each of which is characterized by signal and noise components, certain noise components being generated by operation of said light-sensitive means, and other means responsive to said electrical currents to produce logarithmic versions thereof and to combine said versions for substantially reducing said noise components and for producing a resultant signal corresponding to the circular-dichroism of the sample.

2. The combination of claim 1 wherein said light-sensitive means comprises the respective photocathodes of two photomultipliers located to intercept the respective beams and said electrical currents consist of electrons emitted from said photocathodes.

3. The combination of claim 2, wherein said other means comprises, in association with each said photomultiplier:

feedback circuitry, connected between an output electrode and a dynode voltage input of that photomultiplier, and characterized as operating to maintain substantially constant an amplified output appearing at said output electrode, whereby dynode voltage at said dynode voltage input varies as a substantially logarithmic function of the corresponding one of said electrical currents.

4. The combination of claim 3 wherein said other means includes first and second channels respectively connected to said dynode voltage inputs, said logarithmic versions being transmitted on said channels.

5. The combination of claim 4 wherein one of said channels includes an inverter for inverting the phase of the logarithmic version associated therewith.

6. The combination of claim 5 wherein said other means includes a combiner connected with said channels for combining said logarithmic versions.

7. Apparatus comprising:

means defining a zone adapted to receive a sample;

illuminating means for simultaneously passing through said zone two predominantly circularly polarized light beams of opposite sense;

detector means disposed to receive said beams after passage through said zone, and for producing two electrical currents corresponding respectively to the intensities of said beams after said passage;

electrical means for receiving said electrical currents and producing electrical signals respectively substantially linearly related to the logarithms of said intensities; and display means, responsive to said signals, for indicating a measured value of circular-dichroism of a sample which may be placed in said zone.

8. The apparatus of claim 7, wherein said illuminating means cyclically reverses the sense of each of said beams, substantially simultaneously;

and also comprising signal-coupling means for receiving said electrical signals and isolating a time-varying part thereof for transmission to said display means.

9. The apparatus of claim 7, wherein said illuminating means comprises:

a light source;

polarizer means for receiving light from said source and producing from said light two orthogonally linearly polarized beams; and optical retarder means characterized by variably linear birefringence, receiving said linearly polarized beams and converting the same into said two predominantly circularly polarized beams of opposite sense.

10. The apparatus of claim 7, wherein:

said detector means comprises a pair of photosensitive surfaces; and said electrical means comprises:

a pair of amplifier means, each connected to receive a corresponding one of said electrical currents from one of said photosensitive surfaces, and each said amplifier means producing an amplified output related by a respective amplification factor to the respective electrical current; a pair of means for establishing each of said amplification factors independently; and means for independently producing two control signals to control said amplification-factor-establishing means;

each said amplification-factor-establishing means being characterized by an approximately logarithmic relation between said control signal and said electrical signal, within a range of operation; each said control-signal-producing means being responsive to a corresponding one of said amplified outputs, and varying said control signal to maintain said amplification factor at a time-varying level characterized in that said amplified signal maintains a substantially constant predetermined value; and said electrical signals being derived from said control signals.

11. The apparatus of claim 10, wherein;

each said amplifier means comprises a photomultiplier having a photocathode, dynodes and an anode;

each said photosensitive surface is a photocathode in the corresponding photomultiplier;

each said electrical current is an electron stream ejected from the corresponding photocathode;

each said amplified output appears at an electrode selected from the group consisting of said dynodes and said anode;

each said amplification-factor-establishing means comprises said dynodes, and apparatus for making electrical connection thereto;

each said control-signal-producing means comprises a source of voltage for establishing voltage difference between at least one dynode in the corresponding photomultiplier and at least one other such dynode in the same photomultiplier;

each said voltage difference is the corresponding said control signal to which said display means is responsive; and each said control-signal-producing means comprises an amplifier responsive to the corresponding said amplified output at the corresponding said electrode, to regulate the corresponding said source of voltage to maintain said amplified output substantially constant.

12. Apparatus for the measurement of circular-dichroism in a sample, comprising:

means including a source of light for producing two beams of light having intensities respectively proportional to characteristic transmission values of such sample for predominantly right- and predominantly left-circularly polarized light;

detector means, disposed to simultaneously receive said beams and to produce electrical currents respectively proportional to said intensities;

said currents being characterized in part by the presence of noise components unrelated to said dichroism, some of said noise components arising in said source of light, and others of said noise components arising through operation of said detector means;

electrical means for receiving said electrical currents and producing electrical signals respectively substantially linearly related to the logarithms of said electrical currents, and for combining said electrical signals after a relative polarity inversion, of one of said signals whereby said noise components are substantially reduced; and means responsive to said electrical signals for indicating measured values of such dichrosim.

13. The apparatus of claim 7, wherein a circularly dichroic sample may be placed in said zone so that said beams passing through said zone pass simultaneously through said sample, said beams being unequally reduced in intensity by such passage.

14. The apparatus of claim 8, wherein:

a circularly dichroic sample is placed in said zone so that said beams passing through said zone pass simultaneously through such sample, beams having opposite circular polarization sense being unequally reduced in intensity by such passage; and said time-varying part arises from coaction of said cyclically reversing with said unequal reducing.

15. The apparatus of claim 7, wherein:

said illuminating means comprises a light source for producing two beams, each comprising predominantly circularly polarized constituents of opposite sense in equal magnitude for passage through said zone;

and comprising:

optical retarder means characterized by variable linear birefringence, disposed to receive said beams after passage through said zone, and to derive from at least some of said circularly polarized constituents two elliptically polarized beams; and polarizing means disposed to receive said elliptically polarized beams and derive therefrom at least one plane-polarized beam for transmission to said detector means.

16. Apparatus comprising:

a source of substantially randomly polarized light of a relatively wide band of wavelengths;

a monochromator disposed to receive said light and select therefrom selected light of a relatively narrow band of wavelengths, said band having a nominal wavelength;

a polarizer, disposed to receive said selected light and to derive therefrom two substantially linearly polarized beams polarized mutually orthogonally;

an element having cyclically varying linear birefringence, disposed to receive said polarized beams from said polarizer and to form therefrom two elliptically polarized beams of opposite sense, whose ellipticity varies cyclically in correspondence with said cyclically varying birefringence, elliptically polarized light being understood to be composed of unequal amounts of circularly polarized light of opposite sense;

means defining a sample zone for simultaneous passage therethrough of both said elliptically polarized beams of light, whereby any circular-dichroic characteristic of a sample which may be positioned in said zone is manifested as unequal reduction of the intensities of both said elliptically polarized beams of opposite sense in the course of simultaneous passage through said zone, and in turn whereby the intensities of said unequally reduced beams vary cyclically in accordance with said varying ellipticity and said dichroic characteristic;

two photomultiplier each disposed to receive one of said elliptically polarized beams, and to produce in response thereto an electrical signal whose magnitude is substantially proportional to the intensity of said elliptically polarized beam, whereby said magnitude varies cyclically in correspondence with said cyclically varying ellipticity and said dichroic characteristic;

dynode voltage supply means for independently activating and controlling the amplification of each of said photomultipliers said activating and said controlling of each said photomultiplier proceeding substantially independently of said activating and said controlling of the other said photomultiplier, and said activating and controlling being characterized by application to each said photomultiplier of a dynode voltage;

a pair of electrical amplifier means each connected to receive one of said electrical signals, and to regulate the corresponding one of said dynode voltage supply means so as to maintain the corresponding said electrical signal substantially constant and at a predetermined level;

whereby a time-varying part of each said dynode voltage represents the circular-dichroism of a sample placed in said zone, except for the inclusion in said time-varying part of unwanted noise components unrelated to said dichroism;

and means for combining additively said two time-varying parts with a polarity inversion of one of said parts relative to the other, to produce an improved representation of said circular-dichroism characterized by substantially reduced relative magnitudes of said unwanted noise components.

17. Apparatus for the measurement of circular-dichroism, comprising:

means defining a zone to receive a sample;

illuminating means, including a source of light, for concurrently passing through said zone two predominantly circularly polarized light beams of opposite sense;

detection and display means disposed to receive said beams after concurrent passage through said zone, and to respond thereto by indicating a measured value of circular-dichroism for said zone, and in such a manner that fluctuations in light intensity which are common to said two beams mutually cancel at least in part in operation of said detection and display means and have reduced effect on said measured value;

whereby fluctuations in operation of said light source affect said measured value to a lesser extent than they affect each of said two beams individually.

18. Apparatus for the measurement of circular-dichroism, comprising:
- means defining a sample zone;
- illuminating means, including a source of light, for concurrently passing through said zone two predominantly circularly polarized light beams of opposite sense;
- detector means disposed to receive said beams after passage through said zone, and to produce two electrical currents corresponding respectively to the intensities of said beams after said passage; and
- electrical processing means and display means for receiving and combining said electrical currents to indicate a measured value of circular-dichroism for said zone, and characterized in that fluctuations in current magnitude which are common to said two electrical currents mutually cancel at least in part and have a reduced effect on said measured value;
- whereby fluctuations in operation of said light source affect said measured value to a lesser extent that they affect each of said two electrical currents individually.

19. The apparatus of claim 17,
- wherein said illuminating means cyclically reverses the sense of each of said beams, substantially simultaneously; and
- said processing means comprises signal-coupling means for receiving said electrical signals and isolating a time-varying part thereof for transmission to said display means.

20. The apparatus of claim 17, wherein said illuminating means also comprises:
- polarizer means for receiving a single, substantially randomly polarized, beam of light from said source and producing therefrom two orthogonally linearly polarized beams;
- optical retarder means characterized by variable linear birefringence, receiving said linearly polarized beams and converting the same into said two predominantly circularly polarized beams of opposite sense.

21. An improved method of measuring circular-dichroism, comprising the steps of:
- simultaneously passing through a sample zone two predominantly circularly polarized light beams of opposite sense;
- detecting both said beams after passage through said zone and producing first electrical signals in response to said beams;
- combining and processing said signals to produce a final electrical signal, said combining being carried out to subject any fluctuations of said first electrical signals due to intensity fluctuations which are common to both said beams to at least partial mutual cancellation in the course of said combining;
- whereby said final signal is substantially freer of effects due to such common intensity fluctuations than are either of said first signals.

22. The method of claim 21, wherein said processing is carried out to cause said final signal to be indicative of the circular-dichroism of any material in said zone.

23. Apparatus as defined in claim 17 wherein said illuminating means comprises, in sequence, a monochromator to receive light from said source, a polarizer to receive light from the monochromator and to produce two linearly polarized beams polarized mutually orthogonally, and an optical retarder to receive said beams and to convert them into said two predominantly circularly polarized light beams of opposite sense.

24. Apparatus as defined in claim 17 wherein said illuminating means comprises, in sequence, a monochromator to receive light from said source, and a polarizer to receive light from the monochromator and to produce said two predominantly circularly polarized light beams of opposite sense; said detection and display means including in sequence after said sample zone an optical retarder to receive said light beams after passage through said zone and to produce two elliptically polarized beams, and another polarizer to receive said elliptically polarized beams and produce two plane-polarized beams.

25. Apparatus as defined in claim 18 wherein said detector means comprises a single phototube to receive said beams in alternating sequence and to produce said two currents in response to said reception.

26. Apparatus as defined in claim 18 wherein said detector means comprises two phototubes respectively to receive said beams and to produce said two currents.

27. Apparatus as defined in claim 18, also comprising means for periodically interrupting said beams independently at two different frequencies respectively,
- wherein said detector means comprises:
  - a single phototube to receive said interrupted beams and to generate a composite electrical signal in response thereto, and
  - frequency-sensitive means for deriving from said composite signal two component signals at said two frequencies, said component signals being said two electrical currents.

* * * * *